United States Patent [19]
Davidian

[11] Patent Number: 5,522,990
[45] Date of Patent: Jun. 4, 1996

[54] OIL REMOVAL DEVICE WITH INTEGRATED GRAVITY SEPARATOR

[76] Inventor: Steven Davidian, 179 High St., Chagrin Falls, Ohio 44022

[21] Appl. No.: 287,100

[22] Filed: Aug. 8, 1994

[51] Int. Cl.$^6$ .................................................. C02F 1/40
[52] U.S. Cl. ...................... 210/242.3; 210/262; 210/523; 210/540
[58] Field of Search .............................. 210/242.3, 242.4, 210/259, 262, 255, 521, 523, 525, 540

[56] References Cited

U.S. PATENT DOCUMENTS

| | | | |
|---|---|---|---|
| 801,330 | 10/1905 | Moore | 210/540 |
| 911,314 | 2/1909 | Maranville | 210/540 |
| 999,747 | 8/1911 | Brown | 210/540 |
| 1,147,881 | 7/1915 | Morris | 210/540 |
| 1,612,557 | 12/1926 | Weisgerber | 210/540 |
| 2,076,380 | 4/1937 | Marsh | 210/540 |
| 3,338,414 | 8/1967 | Lefke et al. | 210/242.3 |
| 3,358,838 | 12/1967 | Kosar et al. | 210/242.3 |
| 3,485,749 | 12/1969 | Reilly . | |
| 3,578,171 | 5/1971 | Usher | 210/242.3 |
| 3,642,140 | 2/1972 | Parker | 210/242.3 |
| 3,643,804 | 2/1972 | Sharpton | 210/242.4 |
| 3,695,451 | 10/1972 | Schmidt, Jr. et al. | 210/526 |
| 3,786,826 | 1/1974 | Taylor | 210/513 |
| 3,865,730 | 2/1975 | Ayers et al. | 210/242.3 |
| 4,021,344 | 5/1977 | Webb | 210/242.3 |
| 4,051,024 | 9/1977 | Lowe et al. | 210/242.3 |
| 4,132,645 | 1/1979 | Bottomley et al. | 210/540 |
| 4,139,464 | 2/1979 | Coward | 210/168 |
| 4,172,036 | 10/1979 | Morris | 210/242.3 |
| 4,220,533 | 9/1980 | Baer et al. | 210/242.3 |
| 4,290,887 | 9/1981 | Brown et al. | 210/525 |
| 4,360,429 | 11/1982 | Morris | 210/242.3 |
| 4,368,122 | 1/1983 | Ravagnan | 210/242.3 |
| 4,497,708 | 2/1985 | Young | 210/242.3 |
| 4,582,604 | 4/1986 | Bashaw | 210/242.3 |
| 4,614,582 | 9/1986 | Campitelli | 210/242.3 |
| 4,642,185 | 2/1987 | Turner et al. | 210/242.3 |
| 4,651,762 | 3/1987 | Bowden | 210/523 |
| 4,797,205 | 1/1989 | Kitamura | 210/242.3 |
| 5,015,378 | 5/1991 | Lewan et al. | 210/249 |
| 5,051,181 | 9/1991 | Sandkvist | 210/242.3 |
| 5,053,145 | 10/1991 | Ellison | 210/242.3 |
| 5,062,953 | 11/1991 | Lewan | 210/242.4 |
| 5,089,121 | 2/1992 | McWhinnie | 210/242.3 |
| 5,106,494 | 4/1992 | Norcross | 210/242.3 |
| 5,137,630 | 8/1992 | Eklund | 210/242.3 |
| 5,164,083 | 11/1992 | Ahrendt | 210/242.3 |
| 5,167,815 | 12/1992 | Bachmann et al. | 210/242.3 |
| 5,223,128 | 6/1993 | Combrowski | 210/242.4 |

OTHER PUBLICATIONS

Product Brochure: ITW Devcon "Tramp Oil Skimmer" (The Sump–Saver) Catalogue Sheet: p. 35, Mechanical Skimmers.

*Primary Examiner*—Christopher Upton
*Attorney, Agent, or Firm*—D. Peter Hochberg; Mark Kusner; Michael Jaffe

[57] ABSTRACT

An oil removal device for separating floating oils from water or water-based liquids. A rotating disk lifts viscous oils frown the water or water-based liquid. The oil is removed from the disk by wiper blades on either side of the disk on the downward part of the disk's travel. The oil then falls into channels and is channeled into a storage container. A support frame comprising a base and a center post attached to the base is connected to and supports the disk, wiper blades and channels. A gravity separating chamber could be used in place of the storage container. Water collected by the disk is diverted from the oil by a small-scale gravity separator module. The gravity separator module includes a weir having a gap or space at the bottom to separate the water from the oil.

9 Claims, 5 Drawing Sheets

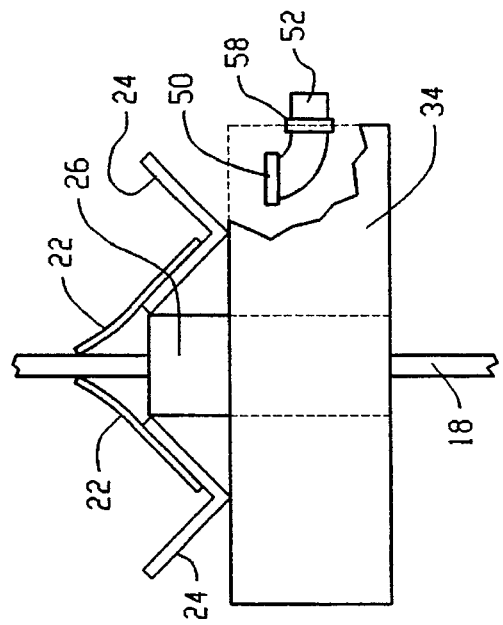
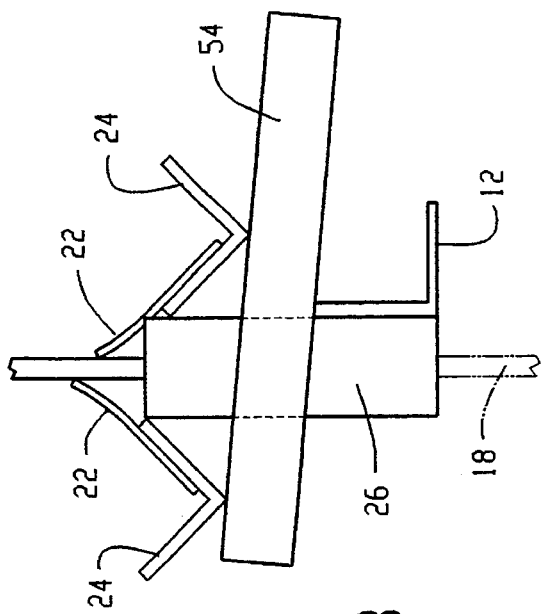
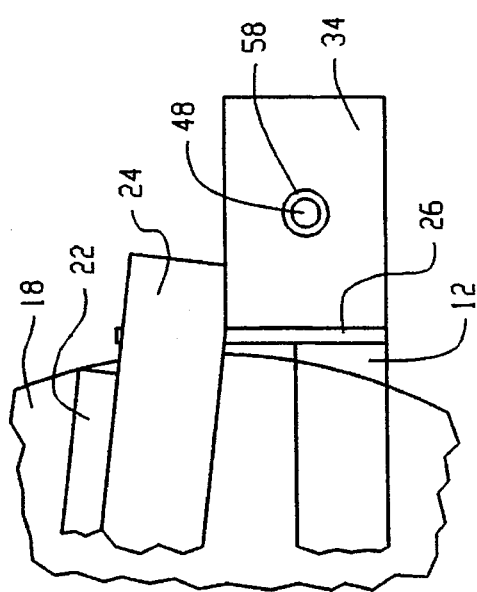
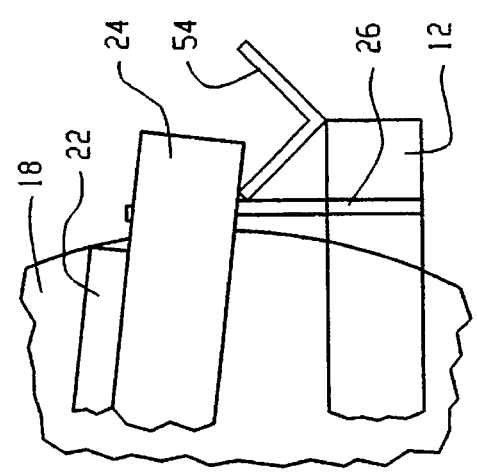

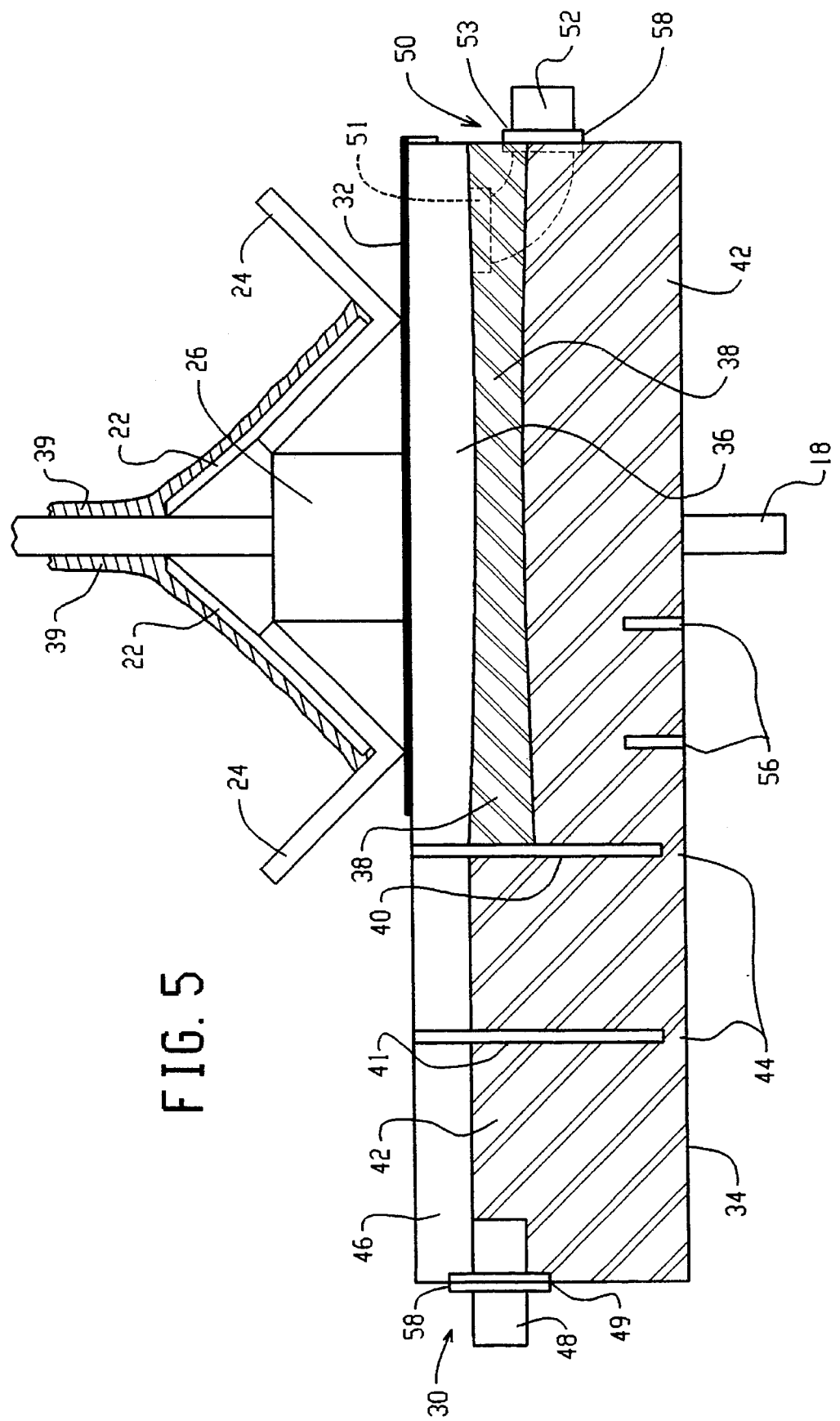

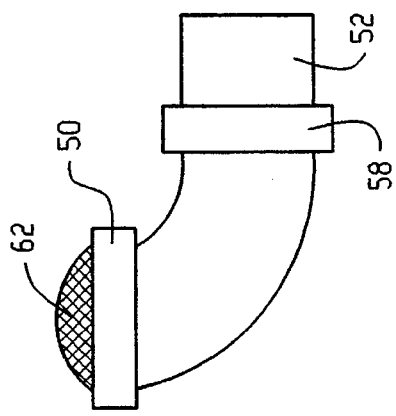
FIG. 7B
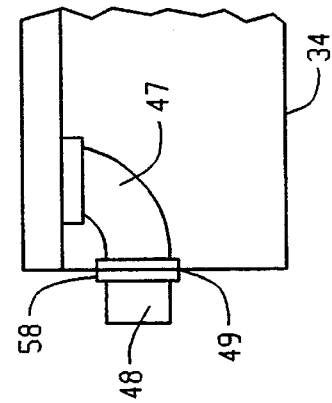
FIG. 8B
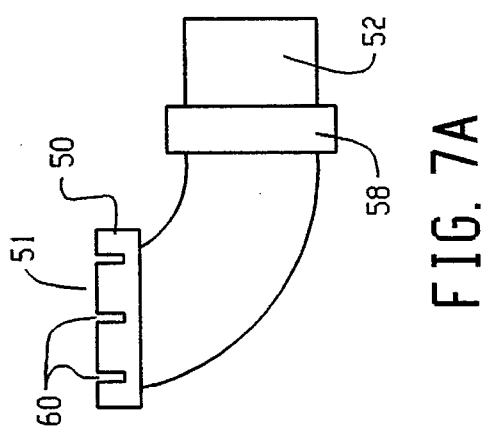
FIG. 7A
FIG. 8A
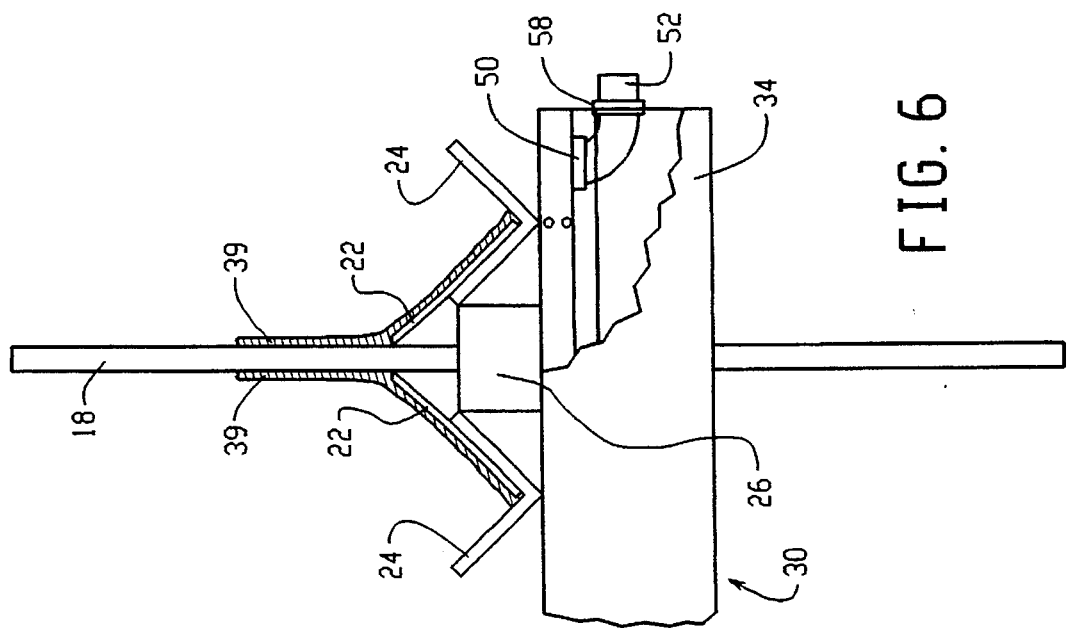
FIG. 6

OIL REMOVAL DEVICE WITH INTEGRATED GRAVITY SEPARATOR

FIELD OF THE INVENTION

This invention relates to a device for collecting and separating oils from aqueous solutions. More particularly, it relates to a compact, disk-skimming device for removing oils from coolants used in metal machining operations and cleaning fluids to wash metal parts.

BACKGROUND OF THE INVENTION

In industrial machining operations lubricating oils, sometimes called "tramp" oils, come in contact with the parts being machined. Much of this tramp oil remains on the surface of the machined parts or chips and is carried to subsequent operations. In these subsequent operations, the tramp oil can enter the recycled cooling fluid. If tramp oil is allowed to accumulate in a coolant or washer system it can cause operating problems, such as machine down-time, increased tool wear, cleaning and filtering problems, and possibly allowing bacteria to grow in the oil accumulated in the system. As a result of these problems, the coolant's effectiveness and useful life are reduced. Preventive maintenance and good housekeeping practices help reduce, but never completely eliminate, tramp oils.

One solution to this problem is to throw out the used coolant solution, replacing it with fresh. This solution, however, is expensive and impractical. Oil-contaminated coolant has recently been classified as hazardous waste, making disposal extremely costly. In addition, the coolant itself is expensive. Therefore, various methods to remove oils front coolant systems have been developed, some of which are discussed below.

Large gravity separators and extractors that rely on either centralized or portable pumping systems have been used in an attempt to separate oil from coolant solutions. These systems are expensive to purchase, require a significant amount of power to operate, are large and bulky, and require time and training to use. Such a system is disclosed in U.S. Pat. No. 5,053,145 to Ellison.

Additionally, a variety of small oil removal devices which operate unattended have been developed. These include drum, belt and disk oil skimming or collection devices. Each of these, however, has shortcomings. Drum devices are the least desirable; they take up the largest amount of space of the three types listed above and remove a large quantity of coolant along with the oils.

Belt devices can access any depth of coolant, but also remove large amounts of coolant along with the oil. In addition, the belt material may be affected by the chemical composition of the coolant or the heat of the wash water. This is discussed in U.S. Pat. No. 4,614,582 to Campitelli.

Disk skimmers also tend to remove much of the coolant along with the oil. They cannot reach as great a depth as the belts, primarily due to the fact that the disk diameter is relatively small and the disk is mounted relatively high above the water. The surface of the disk, therefore, extends only a few inches into the coolant/oil mixture to be separated. In addition, during operation solids impact the disk, chipping or deeply scoring the disk. The disk then removes even more of the coolant, further degrading its performance.

A disk skimmer described in U.S. Pat. No. 5,167,815 issued to Bachmann et al. has addressed one problem described above by the use of a flotation device and a parallel arm arrangement to enable the disk to skim from varying fluid levels. It uses a screw mechanism and floating arrangement to separate the oil from the coolant. This design, however, is bulky and expensive. Further, the problem of the disk removing excessive amounts of coolant, however, is not resolved by this device.

In summary, the known small, unattended oil-removal devices, such as disk skimmers, have the following limitations:

A) They tend to remove excessive amounts of coolant or wash water along with the oils, B) Their performance degrades as the disk or pickup media wears, C) They require a large area for mounting onto the machine on which they will be used; this area is more than many machines can permit, D) Disk skimmers cannot handle wide fluctuations in fluid levels because the disk does not extend deeply into the coolant/oil solution, E) Current disk skimmers are heavy and bulky, F) Current designs require many manufacturing steps and require assembly by the user, G) Current designs cannot be easily adapted to incorporate a separate module for separation of the oil and the water, H) Current disk skimmer designs force the user to separate oil from the water in a second, secondary process step, and I) Current gravity separators used with oil removal devices are large, expensive and impractical.

BRIEF DESCRIPTION OF THE INVENTION

According to the present invention there is provided a device for removing oil from a water-based solution. The device includes oil-collection means, which is preferably a disk, and drive means for moving the disk into and out of the water-based solution. Oil-removal means contact the surface of the oil-collection means and remove the oil collected. The oil then falls into channel means and is channeled to a receptacle. A support frame is provided and is connected to the oil-collection means, drive means, oil-removal means and channel means. The support frame includes a base and a generally vertically extending center post connected to the base. The oil-removal means and oil channeling means are connected to the center post.

In another embodiment of the invention a device is provided as described above which is further provided with a receptacle attached to the center post.

In another embodiment of the invention, the receptacle comprises an oil-separating device having two open baths separated by a weir wall. The wall has an opening along its bottom edge to allow for the passage of coolant between the two baths. A drainage conduit is contained within one bath for draining oil and a drainage hole is contained in an outer wall of the other bath for draining water.

It is an object of the present invention to provide a device which removes oil from a water-based solution.

Another object of the present invention is to provide a device as described above having a support frame which uses less steel and is lighter than prior art inventions.

Another object of the present invention is to provide a device as described above having oil-collection means in the form of a circular disk.

Another object of the present invention is to provide a device as described above wherein the device includes oil-removal means to remove the oil collected by the oil-collection means.

Another object of the present invention is to provide a device as described above wherein the oil removed by the oil-collection means is collected by collecting means.

Another object of the present invention is to provide a device as described above wherein the oil-collecting means are well supported so that they can be made longer than those used on prior art devices.

Another object of the present invention is to provide a device for removing oil from water which allows for deeper penetration into the oil/coolant solution in order to compensate for varying solution levels.

Another object of the present invention is to provide a device which is smaller than prior art devices and, therefore, easier to install.

Another object of the present invention is to provide a device which is easy to use and economical to manufacture.

Further objects and advantages of the invention will become apparent from a reading of the drawings, ensuing description and the appended claims.

DESCRIPTION OF THE DRAWINGS

FIG. 2A is a partial side view of the center support member and the gravity separation module;

FIG. 2B is a front, partial sectional view of the center support member and the gravity separation module;

FIG. 4A is a partial side view showing the center support member of FIG. 2; FIG. 4B is a front view showing the gravity separation module and support structure of the device of FIG. 3;

FIG. 5 is a front sectional view of the invention shown in FIG. 1 during operation;

FIG. 6 is a front view of the center support member showing the wiper action of the preferred oil-removal means;

FIG. 7A is an enlarged, side view of an oil removal conduit which can be used with the present invention, wherein the intake port of the removal conduit includes notches; and FIG. 7B is an enlarged side view of an oil removal conduit having a screen over the intake port.

FIGS. 8A and 8B are schematic views of two embodiments of a water outlet used with the invention.

DETAILED DESCRIPTION OF THE INVENTION

Figure 1:
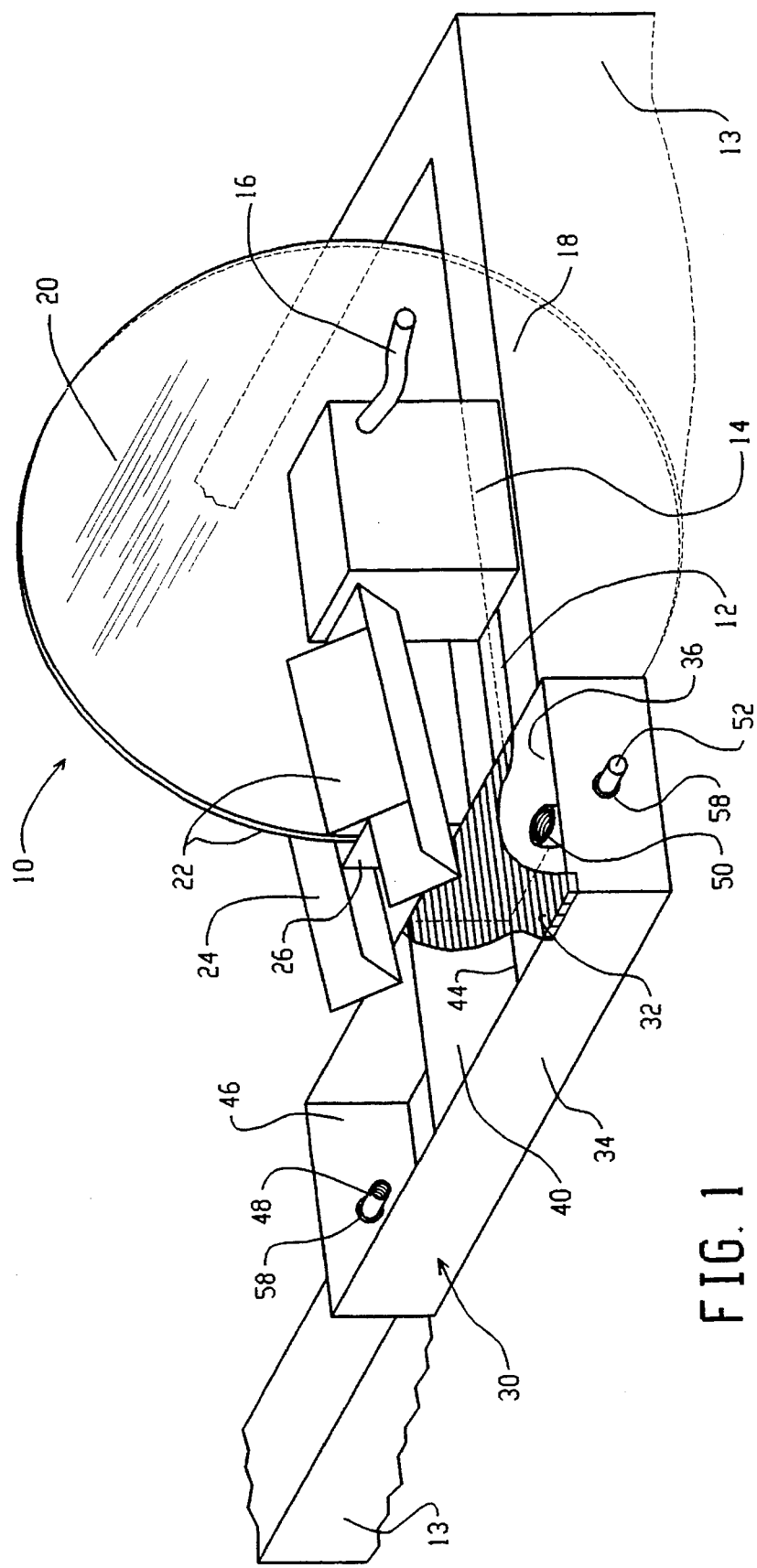
FIG. 1 is a perspective view of the preferred embodiment of the present invention, including the gravity separation module.

In general, FIG. 1 shows a perspective view of the basic embodiment of the improved disk skimmer 10, and FIGS. 2A and 2B show a partial side and end view of the embodiment. A base angle support member 12 is designed so that the flat bottom may rest on the side of a tank 13 with a disk portion 18 being partially immersed in the liquid (not shown) contained in the tank. A gravity separator module 30 is positioned such that it operates in conjunction with skimmer 10.

The liquids in tank 13 include a water or water-based liquid and a free-floating oil (not shown). Base angle support member 12 is fastened to a central support structure 26 via weld or other means of attachment. Base angle support member 12 supports separator 30 and separator 30 is fastened to member 12 so that preferably their bases are in the same plane. In the preferred embodiment, separator 30 is configured so that its longitudinal axis is perpendicular to the longitudinal axis of base angle 12.

FIGS. 2A and 2B show how a pair of wiper troughs 24 are supported simultaneously by support 26 and an inner edge of a separator body 34. Wiper troughs 24 are inclined downwardly at an angle away from a motor 14. Each wiper trough 24 has an inner edge closest to disk 18 and an outer edge away from disk 18. Wiper blades 22 are then fastened to the inside face of both wiper troughs 24.

Figure 3:
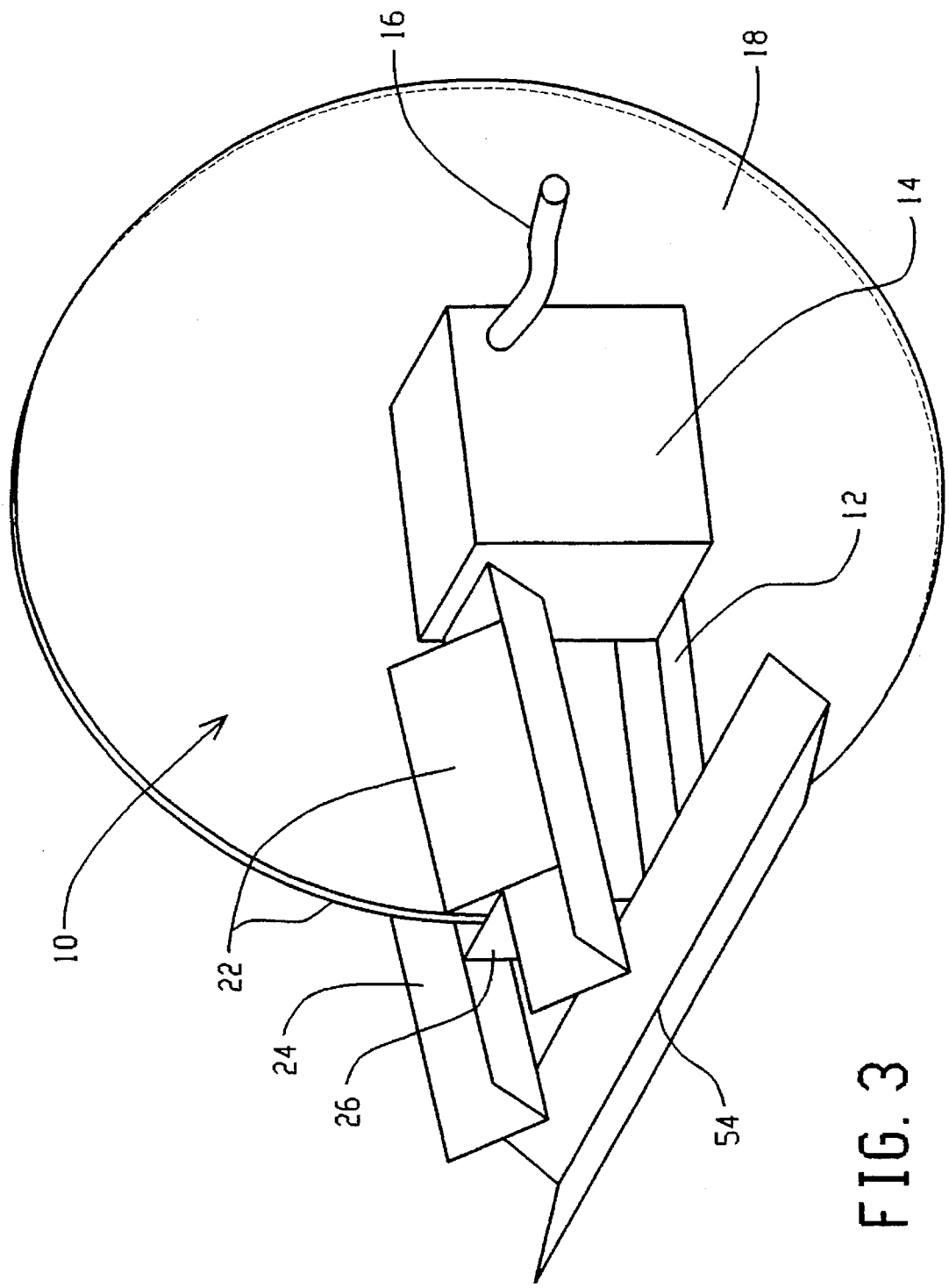
FIG. 3 is a perspective view of a second embodiment the invention.

FIG. 3 illustrates the second embodiment. Instead of having separator 30, a discharge trough 54 is provided which inclines downwardly away from the side of the tank or vessel 13 that the improved disk skimmer is placed upon. Trough 54 is fastened to support 26 and base angle 12. In addition, discharge trough 54 also helps to support wiper troughs 24 at their lower edges, forcing wiper troughs 24 to be staggered in height by a predetermined distance depending upon the angle that discharge trough 54 inclines downward. This is best shown in FIGS. 4A and 4B.

As shown in FIGS. 1 and 3, one end of base angle 12 is attached to a motor 14. Motor 14 is powered via an electric cord 16, and has disk 18 fixed to its output shaft (not shown). Disk 18 is positioned so that it is midway between both wiper troughs 24. Disk 18 also has two roughened or textured surfaces 20 that are the product of scoring or a similar process.

FIG. 1, 5 and 6 show gravity separator 30 in its basic form. Separator body 34 acts as both tank and frame for supporting all other members. A water outlet 48 and an oil overflow outlet 50 are positioned respectively in opposing holes 49 and 53. These outlets are sealed to separator body 34 by way of a variety of standard methods, the preferred method being the use of watertight fittings 58. Oil outlet 50 is an elbow-shaped tube having an intake port 51 and an outlet port 52. A water-rejecting notch(es) 60 or water-rejecting screen 62, both of which act to exclude water from intake port 51 while admitting oil, are illustrated in FIGS. 7A and 7B.

Water outlet 48 has an intake port which is formed to be in a range from parallel to, or perpendicular to, the surface of the liquid. FIGS. 1, 5 and 6 show the outlets to be perpendicular to the water level. This orientation gives water outlet 48 a bottom inner edge and a top inner edge. The level of water 42 will then be determined by the top inner edge of the opening of water outlet 48. At the opposing end of separator 30, the top of intake port 51 is placed at a height equal to the top inner edge of water outlet 48. Its orientation is parallel to the surface of water 42. One or more fixed underflow weirs are placed in a position between water outlet 48 and troughs 24. Weirs 40 and 41 are shown. Weir 40 divides separator 30 into two compartments, an oil collection compartment 36 and a water collection compartment 46. Underflow weirs 40 and 41 are generally flat, planar walls and are vertically oriented with their top edges being level with the top edge of separator body 34 and their bottom edges being above the bottom of separator body 34 defining a fixed underflow weir gap 44.

Alternatively, water outlet 48 can be replaced by an elbow-shaped tube shown in FIG. 8A. Here, the water outlet comprises an elbow-shaped tube 47 with an opening parallel to the water. The function of tube 47 is often easer to understand while the apparatus is in operation. Another outlet device is shown in FIG. 8B wherein the separator wall is wrapped around a water outlet 47', wherein the elbow 47 of FIG. 8A is rotated 180° as shown.

As shown in FIGS. 1, 5 and 6, chip barriers such as a chip screen 32 are optionally provided between wiper trough 24 and oil compartment 36. Additionally, a heavy-particle barrier 56 can be placed on the bottom of separator body 34 in order to impede the progress of small metallic particles that could block or disrupt the flow of water through gap 44. Barriers 56 can be made of any raised surface, including a weld seam or a piece of strip steel.

Turning now to the operation of device 10, the gravity separator module disclosed herein uses small scale hydrodynamic forces for efficient operation. Separator 30 uses water-rejecting notches 60 or water-rejecting screen 62 shown in FIGS. 7A and 7B to help exclude water from oil outlet 50. In addition, the separator 30 must accommodate the episodic flow of water 42 through outlet 48 in order to work effectively. In fact, the separator 30 is the only known unit to utilize small scale hydrodynamic forces to its benefit. It is able to work with extremely small pipe diameters and very shallow depths.

Oils 38 are preferentially adsorbed over water 42 onto the surface of disk 18 due to the much higher viscosity of oils 38. In the absence of oils 38, water 42 will also be adsorbed by disk 18, but in much smaller quantities due to its less viscous nature.

FIGS. 5 and 6 show solution 39 containing oils 38 and water 42 entering separator 30 from wiper troughs 24 where it is channeled into oil compartment 36. The solution is collected and hence flows into oil compartment 36 at a rate depending upon the size, speed and degree of roughness of the surface 20 of the disk 18. Since water 42 is beaver than oil 38 it will separate and drop to the bottom of oil compartment 36. Heavy particles that may have gotten past chip screen 32 will also drop to the bottom of compartment 36. Water 42 will then flow over barriers 56, through gap 44, into water compartment 46. Water 42 collects until it rises to the top of water outlet 48. Once water 42 reaches the level of outlet 48 it exits periodically or episodically, not continuously. In other words, water 42 increases its level until the pressure in water tank 46 is great enough to overcome the hydrogen bonding within water which creates a meniscus (not shown), the meniscus being a convex surface that forms on the surface of water 42. As the level of water 42 increases, so does the pressure on the meniscus. Once enough pressure has formed, the meniscus will break and the water will flow through outlet 48 until its level fails to the bottom of water outlet 48.

Specific gravity is a unit of measurement defined as the ratio of the weight or mass of a given volume of a substance to that of an equal volume of another substance. It is used to indicate relative density. Water has a specific gravity equal to one. Lighter-than-water liquids, such as oils 38, have a specific gravity less than one. These liquids will, therefore, rise to the surface of water. Oil 38, therefore, rises to the top of water 42 in oil compartment 36 and is impeded from flowing into water tank 46 by underflow weirs 40 and 41. Oil 38 then accumulates and flows over the lip of intake port 51, through oil outlet 50, past an oil outlet port 52 and out of oil compartment 36. As shown in FIGS. 7A and 7B, water-rejecting notches 60 and water-rejecting screen 62 help impede the entry of water and water-based liquids. Oil 38 has a much weaker surface tension, because it does not have strong internal bonding forces and does not form a meniscus like water; therefore, oils 38 can penetrate small holes much easier than water 42. Seals 58 are preferably used to keep the liquids from leaking out of separator 30.

This central support structure of the invention will allow the disk to skim deeper than any other skimmer of similar design. In addition, it uses less material in its construction over conventional designs. As a result, it weighs less, is easier to manufacture, it is easier to pack and ship, and it is easier to install because it has a smaller support frame and requires less space for mounting.

Additionally, this invention allows the addition of the gravity separator module, a unique invention in its own right that separates the water from the oil in the solution collected by the disk, eliminates water in the oil output, saves the user time by eliminating a second oil/water separation step, and that it is able to mimic the function of large gravity separators by utilizing small-scale hydrodynamic forces to its advantage.

Thus, the improved disk skimmer construction and small scale gravity separation module provides for an extremely compact, lightweight, and efficient invention that combines what had been two separate components into one. This economical product can be utilized on all machines that use localized coolant cleaning systems, as well as on aqueous parts-washing machines. The term water-based solution as used herein means water, water solutions, water-miscible fluids and other liquids denser than oil.

While the above description contains many specificities, these should not be construed as limitations on the scope of the invention, but rather as an exemplification of one preferred embodiment thereof. Many other variations are possible. For example, the central support could be made of many different types of structural materials besides the bar stock shown, including round and square bar stock or tubes, pipes, angle iron, plastic or other similar materials. The gravity separator module could be dimensioned differently, for example, it could be very deep and narrow, or it could have a shape other than rectangular. The gravity separation module could be positioned in another location, for example, underneath the skimmer. The gravity separation module could be supplied independently of the skimmer, or be fed by some other means such as a belt, tube, mop or other known pickup media designed for small scale quantities of oil and water. The size of the skimmer could be larger or smaller than is represented herein.

Accordingly, the scope of the invention could be determined not by the embodiments illustrated, but by the appended claims and their legal equivalents.

What is claimed is:

1. A device for removing oil from a mixture of oil and a water-based solution, said device comprising:

support means comprising:
a generally horizontally extending base member for supporting said device on a generally horizontal support surface, and
a vertically extending central support member attached to said base member, said central support member extending in a direction generally perpendicular to said base member;

drive means mounted to said base member;

a pair of oil-removal means, each oil-removal means laterally mounted to opposing sides of said central support member and defining a gab therebetween;

rotatable oil-collection means for collecting a mixture of oil and water-based solution, said oil-collection means attached to said drive means which rotates said oil-collection means about an axis transverse to the longitudinal axis of said base member, through the gap between said pair of oil-removal means; and oil-channeling means mounted to said base member and said central support member, and positioned beneath said oil-removal means for channeling said mixture collected by said oil-collection means.

2. A device as defined in claim 1, wherein said oil-collection means is a disk, said disk having a first oil-collection surface and a second oil-collection surface.

3. A device as defined in claim 2, wherein said oil-removal means is comprised of a pair of wiper blades respectively in contact with said first and second oil-collection surfaces.

4. A device as defined in claim 2, wherein said oil-channeling means comprises a first takeaway trough, a second takeaway trough and a central trough positioned beneath said first takeaway trough and said second takeaway trough.

5. A device as defined in claim 2 wherein said disk is a circular disk.

6. A device as defined in claim 1, which further comprises a solution receptacle attached to said central support member, said solution receptacle receiving the mixture channeled from said oil-channeling means.

7. A device as defined in claim 6, wherein said solution receptacle comprises oil-separation means for separating the oil from the water-based solution collected by said oil-collection means.

8. A device as defined in claim 7, wherein said oil-channeling means consists of a first takeaway trough and a second takeaway trough, said troughs each being positioned above said oil-separation means.

9. A device as defined in claim 7, wherein said oil-separation means comprises:

a tank having a bottom, a wall separating said tank into a first compartment for receiving said water-based solution and said oil, and a second compartment for receiving only said water-based solution, a passage being defined between said wall and said bottom of said tank, said passage enabling said first compartment to communicate with said second compartment, an oil outlet contained in said first compartment, and a water-based solution outlet contained in said second compartment.

* * * * *